July 26, 1927.  
L. O. CULVER  
1,636,684  
FRUIT JAR AND CLOSING MECHANISM  
Filed Feb. 26, 1926 2 Sheets-Sheet 1

WITNESSES:  
Alfred E. Ischinger  
George A. Gruss

INVENTOR:  
Lewis O. Culver,  
BY  
Joshua R. H. Potts  
ATTORNEY

July 26, 1927.

L. O. CULVER

FRUIT JAR AND CLOSING MECHANISM

Filed Feb. 26, 1926   2 Sheets-Sheet 2

WITNESSES:
Alfred E. Ischinger
George A. Gruss

INVENTOR:
Lewis O. Culver,
BY
Joshua R.H. Ton
ATTORNEY

Patented July 26, 1927.

1,636,684

UNITED STATES PATENT OFFICE.

LEWIS O. CULVER, OF WEST PITTSTON, PENNSYLVANIA, ASSIGNOR, BY DIRECT AND MESNE ASSIGNMENTS, TO CULVER-BEVAN FRUIT JAR COMPANY, OF WILKES-BARRE, PENNSYLVANIA.

FRUIT JAR AND CLOSING MECHANISM.

Application filed February 26, 1926. Serial No. 90,753.

My invention relates to fruit jars and more especially to jars made of glass or other vitreous material and the objects of my invention are to provide a jar of simple and inexpensive construction and simple and efficient closing mechanism adapted to cooperate with the jar and which may be quickly and easily applied and removed.

Figure 1:
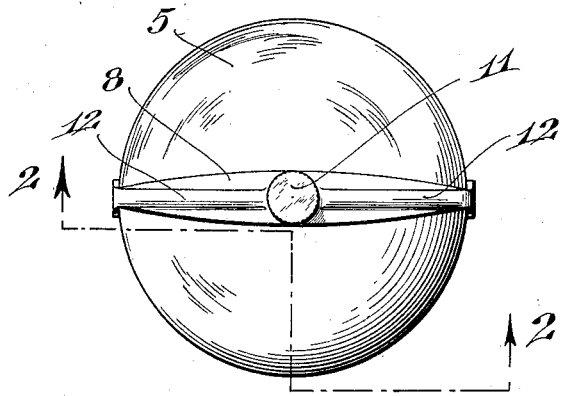
Figure 2:
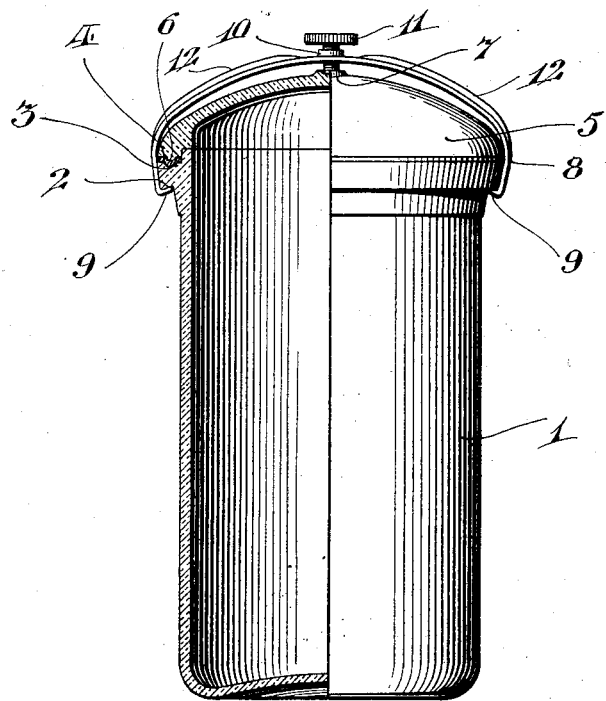
Figure 3:
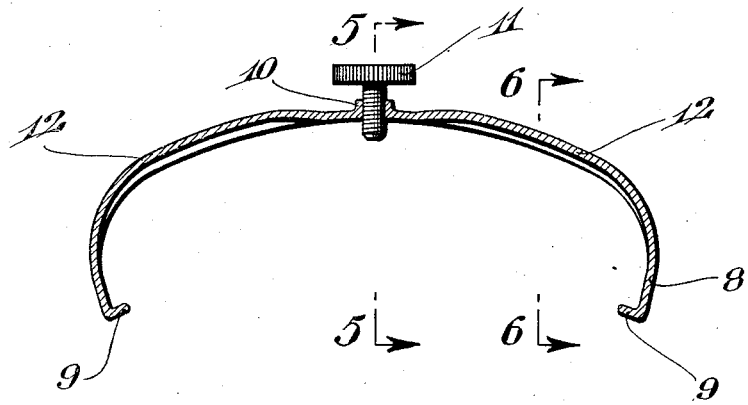
Figure 4:
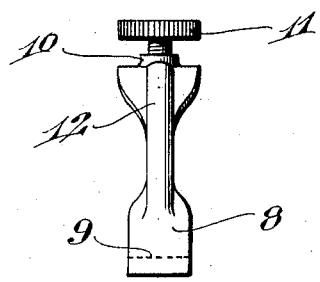
Figure 5:
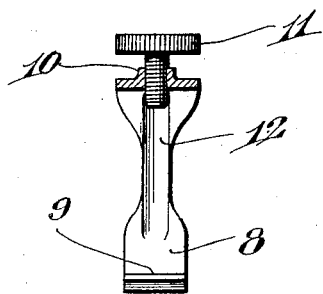
Figure 6:
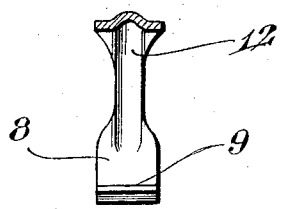

These objects, and other advantageous ends which will be described hereinafter, I attain in the following manner, reference being had to the accompanying drawings in which Figure 1 is a plan view of a jar and closing mechanism embodying my invention, Figure 2 a side view of the same, partly in elevation and partly in section on line 2—2 of Figure 1, Figure 3 a central longitudinal section of a clamping element, Figure 4 an end elevation of the same, Figure 5 a section on line 5—5 of Figure 3, and Figure 6 a section on line 6—6 of Figure 3.

Referring to the drawings, 1 indicates the body of the jar which is provided, adjacent its mouth, with an annular undercut shoulder 2 and in its upper face with an annular groove 3 adapted to receive an annular disk-shaped elastic washer 4. The cover 5 is provided in its under peripheral face with an annular tenon 6 registering with groove 3 and in its upper center with a socket 7. A sheet metal clamping member 8 of yoke form has at its ends inwardly and upwardly extending flanges 9 adapted to take under the undercut shoulder 2, and also has, midway of its length a tubular bearing 10 stamped therefrom and threaded to receive a thumb screw 11. In order that the clamping member may be both light and strong, I prefer to form it with longitudinal corrugations 12 extending the greater part of the length of its body part.

The jar is simple, presents no troublesome manufacturing problems and has no lugs or other protuberances which are liable to breakage.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A fruit jar, having an undercut annular shoulder adjacent its mouth and a flange of substantial height extending upwardly from the inner edge of the shoulder, in combination with a metallic clamping member having upwardly and inwardly extending end flanges adapted to engage the undercut shoulder and having reinforcing ribs formed in the body part, the ends of said body part adjacent said ribs being adapted to press against the cover of the jar, a threaded tubular aperture formed near the center of the clamping member, and a thumb screw mounted in the threaded aperture and adapted to engage the cover of the jar.

2. As an article of manufacture, a fruit jar clamp consisting of a body member stamped from sheet metal having longitudinal reinforcing ribs formed therein and bent to conform to the top portion of a fruit jar, each end of said body member immediately adjacent said ribs being adapted to press against the cover of the fruit jar, an upwardly and inwardly extending flange formed at each end of the body member, a central expanded aperture having threads formed therein, and a thumb screw fitted in the aperture and adapted to engage the cover of a fruit jar.

In testimony whereof I have signed my name to this specification.

LEWIS O. CULVER.